June 11, 1957   R. A. PERRY   2,795,098
COMBINED LAWN MOWER AND SWEEPER
Filed May 9, 1955

INVENTOR.
ROY A. PERRY
BY Elliott & Pastoriza
ATTORNEYS

United States Patent Office 2,795,098
Patented June 11, 1957

2,795,098

COMBINED LAWN MOWER AND SWEEPER

Roy A. Perry, Santa Monica, Calif.

Application May 9, 1955, Serial No. 507,013

5 Claims. (Cl. 56—249)

This invention relates generally to garden tools and more particularly, to a combined grass-cutting and leaf sweeping tool for facilitating law maintenance operations.

Leaf rakers and sweepers, as separate tools, are well known in the art. Leaf raking is an arduous chore at best, but is unnecessarily prolonged when attacked with conventional hand rakes in that it is usually necessary to rake the leaves into several small piles to avoid unwieldy accumulations of leaves in the rake teeth. These small piles must be collected into a central pile where the leaves may be burned or otherwise disposed of.

Another problem in raking leaves arises when a lawn has been mowed prior to removal of the leaves. Such grass mowing operation cuts up the dead leaves into small pieces, making them extremely difficult to pick up by the conventional hand rakes, principally because of the relatively large spacing between the rake teeth. If the spacing between these teeth is made too small, the leaves tend to clog the rake and render it useless.

It is a primary object of the present invention accordingly, to provide a combined lawn mowing and leaf sweeping tool of such design that when used as a leaf sweeper, the tool will pick up leaves of all normally encountered sizes and shapes from the lawn and scoop them into a receiving basket, preferably of the type normally employed on lawn mowers for catching grass.

Another object is to provide a combined lawn mower and leaf sweeper which may be quickly and easily converted manually from one type of tool to the other.

Still another object is to provide a combined mower and sweeper which employs most of the features of a conventional reel lawn mower, whereby the combined tool may be produced economically by effecting only slight structural modifications in the conventional mower.

Briefly, these and other objects and advantages of this invention are attained by removing the trailing roller adjacent the cutting bar in a conventional reel lawn mower, and incorporating a novel first adjusting means for setting the cutter bar in desired positions relative to the mower frame supporting the cutting reel. This adjusting means enables the cutter bar to be secured in a forward, rearward, upward, or downward position with respect to the cutting reel. A second adjusting means, in a preferred embodiment, is provided in the form of a brace means supporting a pair of spaced trailing rollers extending generally rearwardly from the frame. This second adjusting means is incorporated for arcuately adjusting these rollers with respect to the axis of the lawn mower wheels, whereby the cutting reel is circumferentially movable to a desired position above the ground.

When using the tool as a lawn mower, the cutter bar is positioned in proper relationship to the cutting reel by manipulation of the first adjusting means. Thereafter, second adjusting means may be used to dispose both the cutter bar and cutting reel a given distance above the ground according to the grass height desired.

To use the tool as a sweeper, the cutter bar is repositioned, by the first adjusting means, generally rearwardly of the cutting reel and spaced therefrom so that no cutting action will result. The second adjusting means is then used to position the cutting reel close to the ground so that the cutting reel blades serve to scoop up dead leaves and even previously cut blades of grass. The cutting bar is adjusted to guide these scooped up leaves into a suitable basket or other type catcher.

A feature of the invention resides in the securing of the open end of the leaf catcher or basket directly to the cutter bar so that leaves scooped up by the cutting reel blades will not be lost or dropped between the cutter bar and the basket.

A better understanding of the invention will be had by referring to a preferred embodiment thereof as illustrated in the accompanying drawing, in which.

Figure 1:
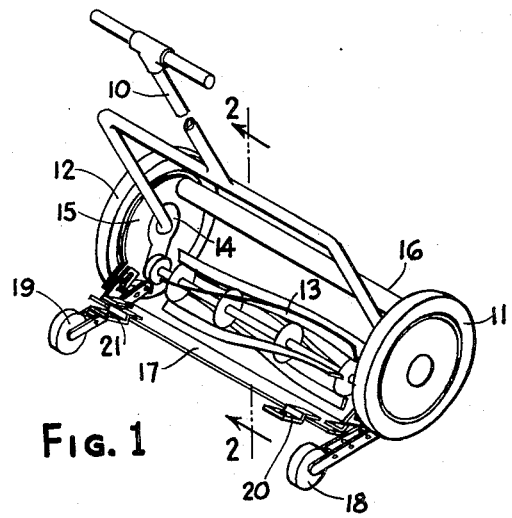
Fig. 1 is a general perspective view of the combined lawn mower and sweeper of this invention in position for cutting grass.

Referring to Fig. 1, there is shown a lawn mower comprising a handle 10, spaced wheels 11, 12, and a cutting reel 13. The cutting reel 13 is rotatably mounted through a gear box 14 to an inner frame 15. Frame 15 supports the wheels 10 and 11 for rotation about a given central axis. The axle for the cutting reel 13 is generally parallel to and spaced from the axis of the wheels and serves, together with a guard rail 16, to brace the frame structure as shown. Thus far, the elements described are entirely conventional and well known in the art. It is therefore not thought necessary to enter into a detailed description of their inter-relationships and operation.

Positioned rearwardly and adjacent the lower end of the cutting reel there is provided a cutter bar 17. This bar is adjustably secured to the frame 15 at each end by a first adjustable means to be described shortly. A pair of rollers 18 and 19 extend generally rearwardly from the frame 15 as shown, and serve to adjust and stabilize the position of the cutting reel blades with respect to the ground. The cutter bar 17 is provided with suitable basket fastening means 20 and 21 adjacent each of its ends respectively, whereby a conventional type grass catcher may be used with the mower.

Figure 2:
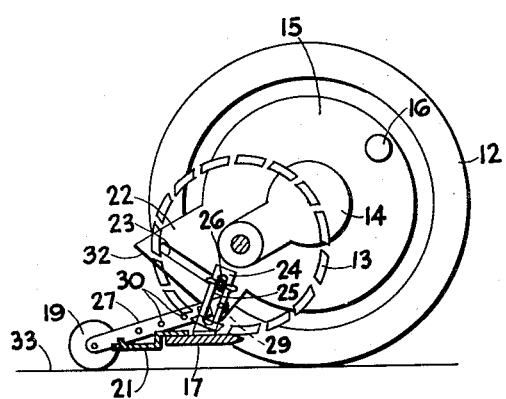
Fig. 2 is an enlarged elevational view of a portion of the mower taken in the direction of the arrows 2—2 of Fig. 1.
Figure 3:
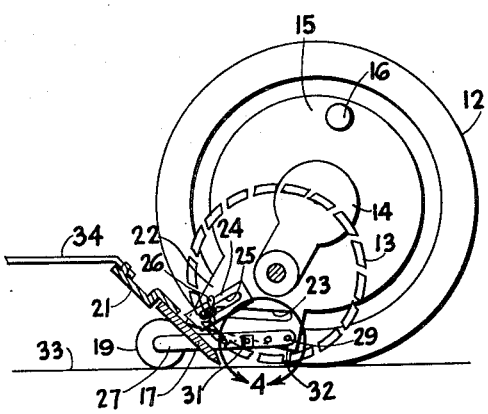
Fig. 3 is a view similar to Fig. 2 when the mower is in position for sweeping leaves; and, Fig. 4 is an enlarged perspective view of a feature of the invention shown in Fig. 2.

Fig. 2 shows one inside portion of the lawn mower looking in the direction of the arrows 2—2 of Fig. 1 with the various parts in position for cutting grass, and Fig. 3 shows the same parts of Fig. 2 in position for sweeping. Since the opposite inside portion is a mirror image of the side portion shown in Figs. 2 and 3, description of one will suffice for both.

Referring to Figs. 2 and 3, it will be observed that the frame 15 is provided with a portion 22 projecting approximately radially with respect to the axis of the wheel 12. Portion 22 is provided with an elongated frame slot 23 extending generally in a forward and rearward direction. The cutter bar 17 is adjustably secured to the portion 22 by means of a bracket member 24 extending upwardly from the cutter bar 17 adjacent to the frame slot 23. The bracket member 24 is provided with an elongated bracket slot 25 extending generally in an upward and downward direction past the frame slot 23. With this arrangement, portions of the frame and bracket slots will be in registration and the cutter bar may thus be secured in a given position with respect to the frame by passing a fastening means through the registered portions of the slots. Preferably a wing nut 26 is used for this purpose.

Extending generally rearwardly from the frame 15 is a roller support comprising parallel brace members 27 and 28. The forward ends of these members embrace the frame portion 22 and are pivoted thereto for arcuate movements as at 29. The free ends of the brace members axially support the roller 19.

Figure 4:
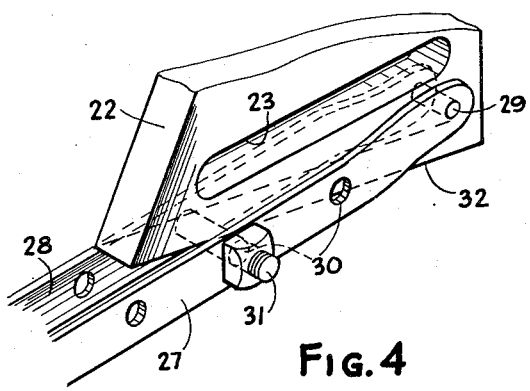

As shown more clearly in the enlarged view of Fig. 4, the brace members are provided with a plurality of spaced bores 30 adapted to receive a bolt 31. Bolt 31 in turn, operates as a stop means limiting the arcuate movement of the braces 27 and 28 in a clockwise direction with respect to the frame 15, by abutting against the lower edge 32 of the frame portion 22. By placing the bolt 31 in different ones of the bores 30, the bolt serving as a stop means is positionable at different linear distances from its pivot point and the angle of the braces with respect to the frame 15 and frame portion 22 may be varied.

The operation of the combined lawn mower and sweeper will be apparent from the above description. To set the tool in position for cutting grass the brace members 27, 28, and roller 19 are swung arcuately in a counter-clockwise direction to circumferentially rotate the frame portion 22 to the position shown in Fig. 2. The bolt 31 is then inserted through an aligned pair of openings 30 to rest against the lower edge 32 of the frame portion 22 and thereby hold the frame in this set position. Movement of the frame as described will serve to raise the cutting reel blades 13 to a desired position above the ground 33 depending upon the desired length of grass to be cut.

The cutter bar 17 is then adjusted to a position in co-operative cutting relationship to the cutting reel blades 13, by loosening the wing nut 26 and urging the bracket 24 and cutter bar 17 forwardly in the frame slot 23. Simultaneously, the cutter bar will be dropped down to register properly with the cutting reel blades 13 so that the wing nut 26 will be disposed close to the upper end of the bracket slot 25. The wing nut 26 is then tightened, and the tool is set for mowing the grass.

When it is desired to sweep leaves, for example, the wing nut 26 is loosened and the bracket 24 and cutter bar 17 moved rearwardly in the frame slot 23. Simultaneously, the cutter bar 17 is angulated to dispose the wing nut in the lower portion of the bracket slot 25 as clearly shown in Fig. 3. The bolt 31 in the brace members 27 and 28 is then removed and the brace and roller 19 swung in a clock-wise direction to rotate the frame 15 from the position shown in Fig. 2 to the position shown in Fig. 3. This movement serves to lower the cutting reel blades 13 to a position adjacent the ground. The bolt 31 is then inserted in suitable openings 30 to secure the brace and roller 19 in the desired position.

It will be noted that the above-described adjustments serve to properly space the cutter bar 17 away from the cutting reel blades 13, but in a cooperative position to receive leaves or other swept material scooped up by the reel blades. Positioning of the reel blades 13 close to the ground as shown, insures that all sizes of loose material will be scooped up by the blades. No cutting action will take place however, since the cutter bar 17 is physically spaced rearwardly of the cutting reel.

The basket attachment 21 is secured directly to the rear longitudinal edge of the cutter bar 17 as shown whereby a conventional basket or grass catcher, only a portion 34 of which is shown in Fig. 3, may be directly attached to the cutter bar. With this arrangement, leaves and other loose material scooped up by the cutting reel blades will be guided directly into the basket by means of the cutter bar. Consequently, with proper angular positioning of the cutter bar, substantially all the leaves are directed into the basket, and no significant amount will fall back onto the lawn.

It will be appreciated from the above description that the present invention results in a combined lawn mower and sweeper which may be provided by effecting only slight modifications in a conventional reel type lawn mower. Further, the tool may be converted relatively quickly from a lawn mower to a sweeper and vice versa.

While the invention has been specifically described with respect to a preferred embodiment as shown in the drawings, it is to be understood that variations within the scope and spirit of the invention will occur to those skilled in the art. The combined lawn mower and sweeper is therefore not to be thought of as limited to the specific constructional details shown and described.

What is claimed is:

1. A combined lawn mower and sweeper comprising: two axially spaced wheels; a frame mounting said wheels for rotation over a ground area; a cutting reel supported between said wheels by said frame, the axis of said reel being parallel to and spaced from the axis of said wheels; a cutter bar; first adjustable means connected between said frame and cutter bar for securing said cutter bar in different forward, rearward, upward and downward positions with respect to said cutting reel whereby said cutter bar may be placed in co-operative shearing relationship with said cutting reel for mowing grass on said ground, and placed immediately adjacent said ground in a separated spaced relationship with respect to said cutting reel, for sweeping action; roller means extending rearwardly from said frame; and second adjustable means connected between said frame and roller means for positioning said roller means with respect to said frame whereby said cutting reel may be set in different circumferential positions with respect to the axis of said wheels to position said cutting reel at different vertical distances with respect to said ground.

2. A combined lawn mower and sweeper according to claim 1, in which said first adjustable means includes: a portion on said frame projecting generally radially with respect to the axis of said wheels; said portion having a frame slot extending in a generally forward and rearward direction; a bracket member secured to said cutter bar and extending upwardly adjacent said frame slot, said bracket member having a bracket slot extending in a generally upward and downward direction; said bracket slot passing across said frame slot whereby portions of each of said slots are in registration; and fastening means passing through the registered portions of said slots for securing the cutter bar in given position.

3. A combined lawn mower and sweeper according to claim 1, in which said second adjustable means includes a brace member pivoted to said frame and extending generally rearwardly, said roller means being secured to the end of said brace; and means for securing said brace in different angular positions with respect to said frame.

4. A combined lawn mower and sweeper according to claim 2, in which said second adjustable means includes a brace member pivoted to said frame and extending generally rearwardly, said roller means being secured to the end of said brace; and means for securing said brace in different angular positions with respect to said frame.

5. A combined lawn mower and sweeper according to claim 4, in which said means for securing said brace member in different angular positions with respect to said frame comprises stop means positionable at different linear distances from the pivot point of said brace member to said frame, said stop means being adapted to abut against a lower edge portion of said frame to check further angular movement of said brace member about said pivot point.

References Cited in the file of this patent
UNITED STATES PATENTS

| | | |
|---|---|---|
| 902,187 | Warrenfeltz | Oct. 27, 1908 |
| 1,204,220 | Whiting | Nov. 7, 1916 |
| 2,197,264 | Cooper | Apr. 16, 1940 |
| 2,340,849 | Wildeboor et al. | Feb. 8, 1944 |